April 13, 1971          A. L. LEWIS          3,574,643
METHOD OF PRODUCING DEHYDRATED POTATO FLAKES
Filed June 14, 1967          2 Sheets-Sheet 1
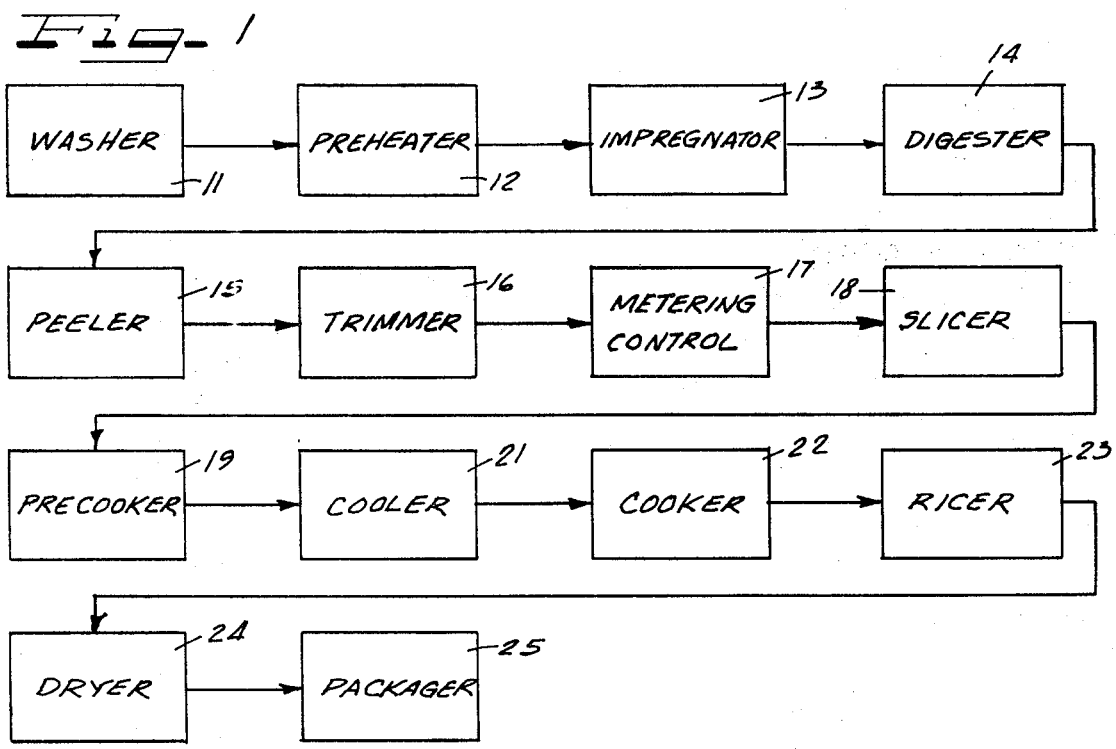
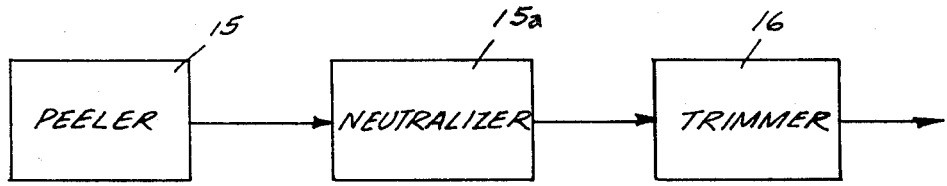
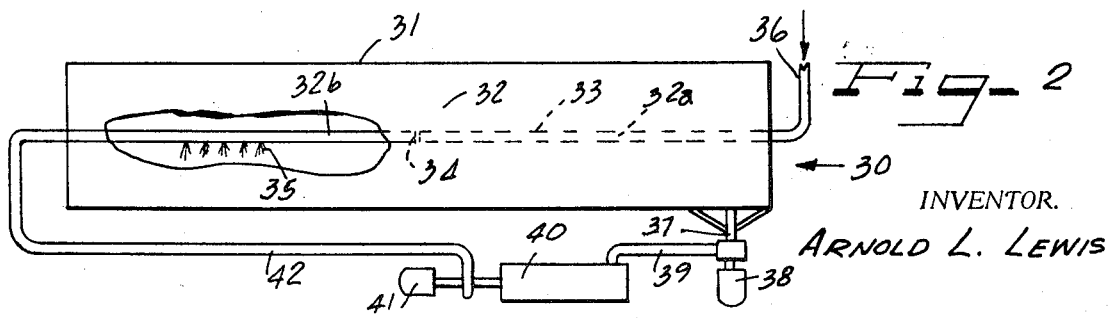
INVENTOR.
ARNOLD L. LEWIS
BY *Hill, Sherman, Meroni, Gross & Simpson*
ATTORNEYS April 13, 1971      A. L. LEWIS      3,574,643
METHOD OF PRODUCING DEHYDRATED POTATO FLAKES
Filed June 14, 1967      2 Sheets-Sheet 2
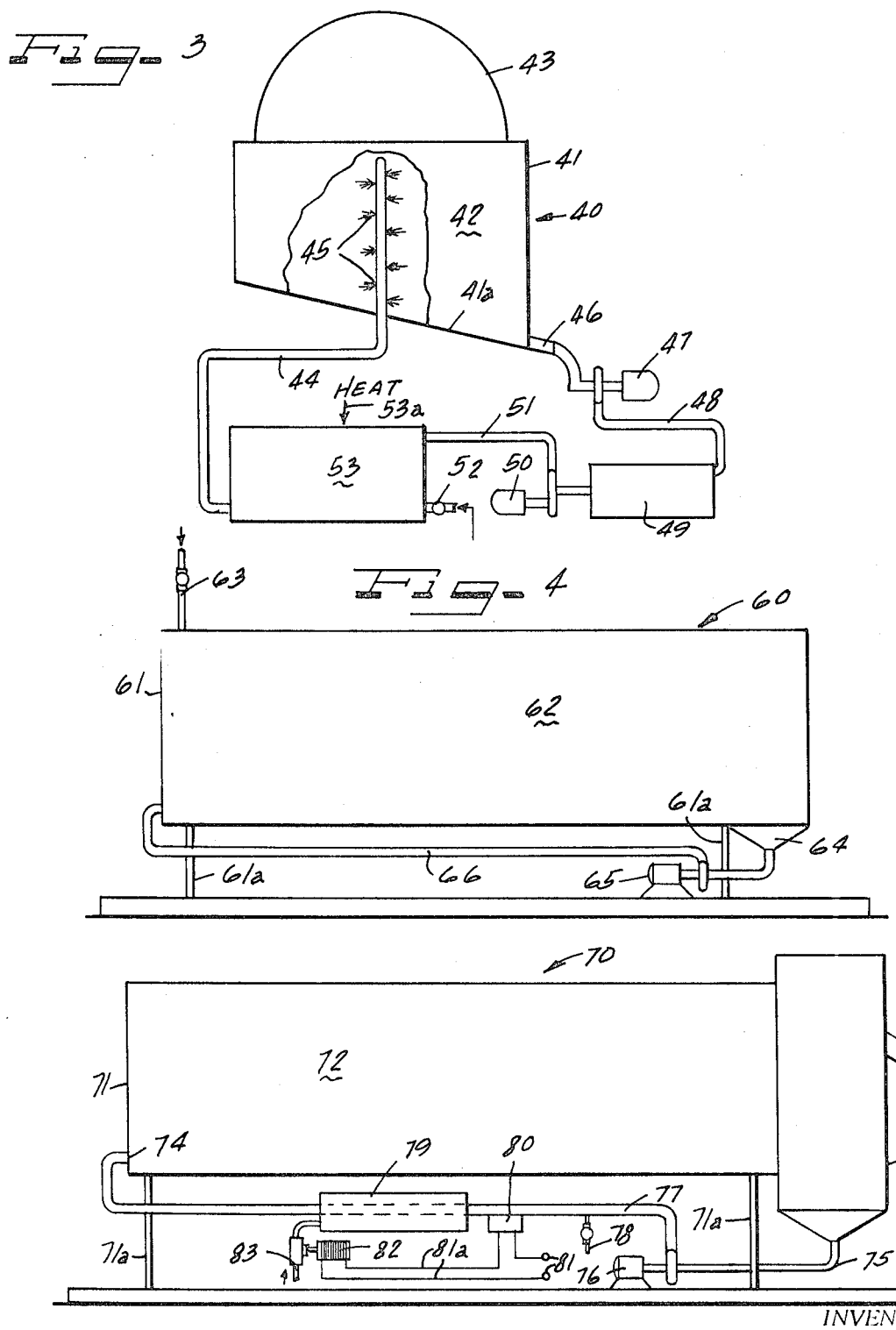
INVENTOR.
ARNOLD L. LEWIS
ATTORNEYS

United States Patent Office 3,574,643
Patented Apr. 13, 1971

3,574,643
METHOD OF PRODUCING DEHYDRATED POTATO FLAKES
Arnold L. Lewis, Dowagiac, Mich., assignor to Overton Machine Company, Dowagiac, Mich.
Filed June 14, 1967, Ser. No. 646,023
Int. Cl. A23b 7/02, 7/03
U.S. Cl. 99—207            11 Claims

ABSTRACT OF THE DISCLOSURE

A method and apparatus for the production of dehydrated potato flakes wherein washed raw whole potatoes are heat-tempered and contacted with a caustic solution, with subsequent removal therefrom to allow impregnation to occur sufficient to effect at least a partial digestion of the outer portion of the potato before peeling, trimming, slicing, pre-cooking, cooling, cooking, ricing, drying and packaging. A system and apparatus for continuously filtering the wash water, the caustic solution and the heating fluids so as to recirculate them for re-use within a constant temperature cooling, pre-cooking and cooking apparatus providing greater economy.

BACKGROUND OF THE INVENTION

This invention relates to an improved process and apparatus for the production of dehydrated cooked potatoes and more specifically to the novel process and apparatus for the production of dehydrated potatoes which upon reconstitution yield potatoes having substantially the appearance, flavor and mealy texture of fresh cooked potatoes.

Many various processes for the dehydration of potatoes, both raw and cooked, have been proposed. All such methods, especially those relating to cooked potatoes, suffer from one or more serious drawbacks. Some yield a product that is discolored or has an objectionable flavor; some destroy the cell structure of the potatoes, thereby liberating excess starch and yielding a reconstituted pasty product; still others yield an acceptable product but are so expensive in terms of time, equipment and required processing materials as to be substantially impractical.

This invention now provides a process and apparatus for the production of uniform high quality dehydrated potato flakes which will reconstitute into a most palatable food which cannot be distinguished from the naturally occurring cooked potatoes, despite variations in growth techniques, geographical areas, or potato varieties and with substantial reduction of required processing materials, equipment, time and cost.

SUMMARY

It is accordingly an important object of the present invention to provide an improved process for the production of dehydrated potato flakes whereby high-quality uniform product is consistently and economically obtained.

It is another object of the invention to provide an improved process for the production of dehydrated potato flakes whereby substantial reduction of required processing materials, equipment and time are effected.

It is another object of the invention to provide an improved process for the production of dehydrated potato flakes wherein washed raw potatoes are pre-heated for a short period of time, immersed in caustic solution and held for digestion out of contact with the caustic solution and then peeled, trimmed, sliced, pre-cooked, cooled, cooked, riced, dried and packaged.

It is a further object of the invention to provide an improved process for the production of dehydrated potato flakes wherein the processing material is continuously filtered and recirculated while the temperature is maintained relatively constant at the various stages of the process.

Further objects, features and advantages of the invention will become more apparent from the teachings of the principles of the present invention in connection with the disclosure of the preferred embodiments thereof in the specification, claims and annexed drawings.

BRIEF DESCRIPTION OF THE DRAWINGS

FIG. 1 is a flow diagram of a preferred form of the process in accordance with the principles of the instant invention;

FIG. 1A is a partial flow diagram of an alternate form of the process in accordance with the principles of the instant invention;

FIG. 2 is a schematic elevational view, with parts broken away for clarity, of a device used in the practice of the instant invention;

FIG. 3 is a schematic elevational view, with parts broken away for clarity, of another device used in the practice of the instant invention;

FIG. 4 is a schematic elevational view of yet another device used in the practice of the instant invention; and FIG. 5 is a schematic elevational view of a further device used in the practice of the instant invention.

DESCRIPTION OF THE PREFERRED EMBODIMENTS

As shown in FIG. 1, a washer 11 receives raw potatoes from the harvest fields, etc. and subjects them to a thorough washing with clean water to remove all dirt and other adhering foreign material contaminants. The washer 10 may be of the barrel-type with relatively high pressure water jets directed on the potato or may be a high-frequency vibrator type. The washer 10 may be provided with a conventional revolving wheel discharge device (not shown) for discharging the potatoes after they have been washed. The cleansed potatoes are then suitably conveyed to a pre-heater 12 to temper the potatoes prior to further processing. The pre-heater 12 tempers the potatoes by uniformly heating them at a temperature of 155° F. to 185° F. for a period of time ranging from about 1 minute to 5 minutes. The tempering treatment that the raw potatoes undergo not only increases the potato reactivity or response to further processing but also tends to change the cellular structure thereof so that a mealy texture, substantially duplicating the texture of freshly cooked potatoes is obtained. This is thought to be primarily due to the change in the form of starch from amylopectin to amylose, i.e., from soluble to insoluble starch. The pre-heater 12 is provided with a suitable discharge device (not shown), as for example a revolving wheel discharge device, feeding the tempered potatoes to a suitable conveyor means.

The tempered potatoes are then conveyed to an impregnator 13 whereat they are immersed in a caustic aqueous solution. The preferred caustic is sodium hydroxide, although other readily available bases are also suitable. Caustic solution is maintained at a pH of at least 7.5 and generally higher, so that about 4 to 10% by weight of caustic material (preferably sodium hydroxide) is continuously maintained within the caustic solution by an appropriate control unit. The impregnator 13 is constructed to allow a relatively high volume of caustic aqueous solution to circulate throughout the potatoes and to heat the solution so as to maintain it at a temperature of 185° F. to 212° F. The heated caustic solution facilitates interaction between the tempered potatoes, particularly the skins and outer portions thereof with the caustic. Generally, sufficient impregnation of the caustic into the outer covering of the potatoes is achieved within 1 to 4 minutes, after which the impregnated potatoes are removed from the solution by an appropriate discharge device. The impregnator 13 may be provided with a suitable means to insure the controlled passage of the potatoes throughout the entire unit.

After the impregnation of the potatoes with the caustic solution, the potatoes are removed, without washing, and suitably passed into a digester 14. The digester 14 maintains the potatoes at a relatively constant temperature for about 5 to 30 minutes and allows the caustic time to react with the skins, etc. of the potatoes. The digester 14 materially reduces the amount of caustic consumed in the impregnation step and thereby reduces the overall cost of processing potatoes. Further, the utilization of impregnation and digesting as separate steps materially reduces the waste disposal problems generally incurred from the amount of caustic present in waste water. The at least partially digested potatoes are then suitably passed through a peeler 15 wherein water, under relatively high pressure, impinges upon the potatoes and removes the digested portion thereof. Digested potatoes may be defined as potatoes that have been impregnated by caustic material to cause a degradation of the impregnated portion thereof. Thus, the digested portions of the potatoes generally include the skin, spoiled or similarly damaged portions of the potatoes, etc. The waste water from the peeler 15 may be filtered and recirculated as will be more fully explained hereinafter, to reduce the total water consumption of the overall process.

As shown in FIG. 1A, the potatoes, after having undergone a thorough washing and peeling process, may optionally be passed through a neutralizer 15a. The neutralizer 15a is primarily used to neutralize any excess caustic solution that may still be adhering to the potatoes subsequent to the peeling operation. Generally, a pH of about 5.5 to 6.5 is sufficient to adequately neutralize any excess caustic in the potatoes.

Referring now back to FIG. 1, the potatoes are next suitably conveyed from peeler 15 (and optionally passed through neutralizer 15a) to a trimmer 16, whereat inferior units and portions thereof not removed during the peeling operation, are removed. This double system of removal of inferior portions increases the ultimate quality of the finished product by allowing only wholesome potatoes to proceed to the final operations. The trimmed and culled potatoes are then passed into a metering control unit 17 wherein the potatoes are collected to control the desired line flow of the process. The metering control unit 17 is preferably provided with a variable speed drive to enable a positive control of potato volume, thereby insuring economical operation and high quality of the finished product.

The metering control unit 17 feeds the potatoes into a slicer 18 whereat the potatoes are reduced in size to substantially uniform slices, cubes or particles, that facilitate uniform cooking at the lowest energy expenditure consistent with the desired product. Preferably, the slicer 18 reduces the potatoes to particle size whereat the thickness is substantially in the range of 0.50 to 0.625 inch. After the potatoes have been substantially uniformly reduced to particle size, they are passed into a pre-cooker 19.

The pre-cooker 19 utilizes a relatively hot aqueous bath to heat the potatoes to a temperature in the range of 145° F. to 185° F. for a period of time ranging from 10 to 50 minutes. The pre-cooking materially aids in controlling the mealiness of the potatoes, thus, if the starting stock was a relatively poor quality (low solids) potato, then higher temperatures (within the range specified) and higher and longer immersion times (within the range specified) convert these poor quality potatoes into one substantially similar to the highest quality potato. On the other hand, if high quality potatoes are used as starting stock, then lower temperatures and shorter immersion time yield a superior product. Without the pre-cooking step, it is difficult to control the mealiness of the final product and generally impossible to utilize lower quality starting stock.

After the uniformly sized potato particles have been pre-cooked a sufficient time in accordance with the solids content of the starting stock, they are passed into a cooler 21 whereat the temperature of the potatoes is reduced to about 40° F. to 80° F. Preferably, the potatoes leave the cooler 21 at a temperature of about 68° F., after an immersion time within the cooler in the range of 10 to 30 minutes. The cooler is provided with a continuously circulating aqueous bath to insure uniform exposure of the potato particles to the cooling media. The pre-cooking and cooling steps tend to aid in converting the soluble starch within the potatoes into substantially insoluble starch that give the final product a more desirable taste.

The cooled potato particles are then suitably conveyed to a cooker 22 whereat the potatoes are cooked at a somewhat higher temperature. The cooker 22 subjects the potatoes to heat in the range of 185° F. to 212° F. for a period of time ranging from 15 to 40 minutes so as to sufficiently cook the potatoes for the subsequent operations. The cooked potatoes are then passed through a ricer 23 whereat the potatoes are mashed with a minimum of cellular rupture taking place. Preferably the ricer 23 is an auger enclosed within a tubular body having closely spaced rods at the discharge end thereof forming a grill through which the potatoes are forced. A rod-type grill is preferred over a screen or other sharp-surfaced grill, as less cellular rupture occurs when a smooth-surfaced grill is utilized. Cellular rupture releases additional starch, imparting an undesirable pasty taste to the finished product. Various chemical additives may be added in the cooked potatoes at the intake end of the ricer 23, so as to become uniformly intermixed therewith at the discharge end, prior to the drying operation.

Generally, the chemical additives utilized to prevent oxidation of the final product are monoglycerides, butylated hydroxyanisole. In addition, sodium acid pyrophosphate is utilized to bleach and remove grayness from the product. As a potato preservative, solutions of sodium sulfite and sodium bisulfite may be utilized. Further, in most locations, it is desirable to add relatively small amounts of citric acid, or the like, to buffer the chemical additives to a pH of about 5.5 to 6.5 before addition of the chemicals to the potatoes.

The mashed potatoes are then passed to a dryer 24 where they are spread in a substantially uniform relatively thin layer on a conventional single or double drum dehydrating machine. Generally, such dehydrating machine is internally steam heated and equipped with a multiplicity of applicator rolls contacting the peripheral surfaces of the drying drum to insure uniform application of the mashed potatoes. The rotational speed of the dryer drum and the internal temperature thereof is suitably controlled so as to give a final product having a moisture content of about 4% to 10%. The dehydrated potatoes are removed from the dryer drum by means of a suitable doctor blade in the form of substantially monocellular sheets and then broken into various sized flakes depending on the desired end quality. The dehydrated potato flakes are then passed to a packager 25 whereat they are suitably packaged for storage, transportation and ultimate use.

The mashed potatoes are applied to the drying drum in a sheet thickness ranging from 0.005 to 0.008 inch so as to avoid cell rupture and increased amounts of free starch while at the same time, allowing rapid dehydration to take place without excessive heat requirements. It has generally been found that the greater the amount of free starch present in the dehydrated potato flakes, the more pasty the reconstituted product tends to be. The dehydrated potato flakes may be reconstituted into a product having a flavor, texture and appearance generally equal to a product provided from fresh potatoes by the addition and intermixing of about 4.5 to 5.5 parts by weight of boiling water or a mixture of boiling water and milk, with various flavor agents, as desired.

Referring now to FIG. 2, whereat a unit 30 which has utility as a washer or a neutralizer in the hereinbefore described process for the production of dehydrated potato flakes is shown. The unit 30 is provided with a body 31 enclosing a hollow chamber 32 which receives the potatoes being processed. Extending the length of chamber 32 is a discharge conduit 33 which is divided into two substantially equal portions 32a and 32b, respectively, by an appropriate separation means 34. The entire length of discharge conduit 33 is provided with a multiplicity of spaced discharge jets 35, which discharge fluid from discharge conduit 35 at relatively high pressure. The first portion 32a of discharge conduit 33 communicates with a water inlet means 36 which receives fresh water from a suitable source, such as a well, and delivers it to the discharge conduit 33.

The body 31 is provided with a recessed water outlet means 37 at the bottom thereof for removing spent water from the chamber 32. The water outlet means 37 is suitably connected to a pump means 38, which aids in the removal of the water and forces the water through a conduit 39 intercommunicating outlet means 37 with a filter means 40. Filter means 40 screens or filters contaminants from the spent water for re-use. A second pump means 41 removes the cleansed water from filter means 40 and pumps it, via conduit 42, to the second portion 32b of discharge conduit 33. The cyclic process of utilizing water, as hereinbefore described, not only reduces the amount of fresh water necessary by about 50%, but also insures a more uniform temperature throughout chamber 32, thereby allowing a more uniform treatment of the potatoes. The potatoes may be discharge from unit 30 by any suitble means, such as a conventional revolving wheel dicharge device (not shown). In addition, unit 30 may be provided with a large, slowly revolving screw having an outer diameter approximately equal to the inner diameter of body 31, so as to positively pass the potatoes through the unit 30.

When it is desired to utilize the unit 30 as a neutralizer, an automatic resistance control unit (not shown) may be connected with the water inlet means 36 and with conduit means 42 to measure the pH of the aqueous solution and add acid as required. This type of device is conventional and need not be described further.

Referring now to FIG. 3, whereat a unit 40 is shown, having utility as a cooker in the process hereinbefore described. The unit 40 is provided with a body 41, defining an inner hollow chamber 42 which is covered with an appropriate shroud means 43. The body 41 and shroud means 43 are preferably heat insulated to prevent excessive heat loss. The chamber 42 receives the potatoes from a suitable conveyor means (not shown).

A water inlet means 52 receives water from a suitable source, such as a pre-heater unit utilized earlier in the process, as hereinbefore described, and delivers it to a heating means 53. Heating means 53 is connected to a suitable heat supply 53a so as to uniformly heat the temperature of the received water. The heated water is then passed by means of a conduit 44 to the chamber 42 whereat it is discharged throughout the chamber by means of a multiplicity of spaced jets 45. The body 41 is also provided with a sloping floor 41a for directing the spent water to a water outlet means 46. Water outlet means 46 receives the spent water and directs it to a filter means 49 via conduit means 48. A first pump means 47 interconnects water outlet means 46 with the filter means 49 to aid in moving the water. Filter means 49 removes any contaminants from the spent water and passes it via conduit means 51 to the heating means 53. A second pump means 50 aids in moving the water from filter means 49 to the heating means 53. Thus, the cyclic circulation system for the heating fluid maintains uniform temperature within the chamber 42 and reduces the volume of heating fluid required. The potatoes may be moved through unit 30 by any suitable means, as for example, large slowly revolving screws having an outer diameter approximately equal to the inner diameter of the body 31 and may be discharged by any suitable means, such as a conventional revolving wheel discharge device (not shown).

Referring now to FIG. 4, whereat a unit 60 having utility as a cooler in the process of producing dehydrated potato flakes, as hereinbefore described, is shown. The unit 60 is provided with a body 61 defining an inner hollow chamber 62 receiving pre-cooked potatoes for cooling. Body 61 is mounted on appropriate support means 61a and communicates with a cool water supply means 63 which receives water from an appropriate source, such as a well, to deliver it to the chamber 62. The body 61 is also provided with a water outlet means 64 which receives the spent water from chamber 62. The water outlet means 64 communicates with a return conduit 66, via pump means 65 to recirculate the water within the chamber 62. High speed circulation aids in maintaining substantially uniform temperature within the chamber 62 and in addition reduces the amount of cooling media required. The potatoes are suitably discharged from unit 60 by any appropriate means, such as a revolving wheel discharge device (not shown) and also move through the cooling unit 60 by any appropriate means, such as slowly revolving screws (not shown).

Referring now to FIG. 5, whereat a unit 70 is shown which has utility as a pre-heater, pre-cooker or an impregnator, in the process of producing dehydrated potato flakes as herein-before described. The unit 70 is provided with a body 71 defining an inner chamber 72 receiving potatoes from a source (not shown). The body 71 is supported by an appropriate support means 71a and has a water ingress means 74 and a water outlet means 75. Attached to one end of body 71 and directly communicating therewith is a conventional revolving wheel discharge device 73 discharging potatoes at chute 73a for further processing. The bottom of the discharge device 73 is inwardly sloped and communicated with the water outlet means 75. The outlet means 75 directs the spent water to a pump means 76. The water is pressure fed from pump means 76 into conduit means 77. At a point beyond pump means 76, a water inlet means 78 joins and communicates with conduit means 77 to admit additional water as needed. The water inlet means 78 receives water from a suitable supply (not shown), such as a portion of the spent water from the pre-heater, pre-cooker or cooker. Of course, the water inlet means 78 may also receive unheated water, as from a well. The conduit means 77 is then passed through a heat exchange means 79 which surrounds conduit means 77 for a distance and heats the water therein. Heat exchange means 79 is connected with a suitable heat supply 83, such as a steam line, which communicates heat to the peripheral surfaces of the conduit means 77, within the confines of the heat exchange means 79.

The amount of heat supplied to the heat exchange means 79 is automatically controlled by a temperature sensing device 80 which is capable of sensing and registering the temperature of the water as it passes into the heat exchanger and activating a switch means (not shown) in response thereto. The signal is then transmitted from the power supply means 81 via communicating means 81a to an appropriate valve control means 82 which regulates the amount of heating fluid admitted to the heat exchanger 79. The water is then passed beyond the heat exchange means 79 and fed into water ingress means 74 of body 71 to recirculate therein. Pump means 76 has sufficient volume to rapidly circulate water throughout the chamber 72 so as to maintain a relatively uniform temperature therein.

When the unit 70 is utilized as an impregnator, an automatic resistance control unit (not shown) is placed in communication with conduit means 77 intermediate the water ingress means 74 and the heat exchanger 79 to measure the pH of the heated solution and add caustic as required. In addition, the unit 70 may be provided with large slowly revolving screws (not shown) having outer diameters generally equal to the inner diameter of unit 70 so as to positively feed the potatoes through the chamber 72 to the discharge device 73.

It is to be understood that the foregoing detailed description is given merely by way of illustration and that various modifications and variations may be made therein without departing from the spirit and scope of the invention.

I claim as my invention:

1. A method of treating potatoes which comprises immersing raw potatoes in an aqueous 4 to 10% by weight caustic solution heated to 185° to 212° F. for 1 to 5 minutes, removing the potatoes from the heated caustic solution while retaining a film of the solution on the potatoes, holding for digestion the removed caustic film-coated potatoes for 5 to 30 minutes under temperature conditions maintained relatively constant to impregnate the potatoes and thereafter impinging water jets on the potatoes to remove the skins therefrom.

2. The method of claim 1 wherein the potatoes are preheated at temperatures of 155° to 185° F. for about one to five minutes before being immersed in the caustic solution.

3. The method of claim 1 including the added step of chemically neutralizing the potatoes with a solution having a pH of about 5.5 to 6.5 after the skins have been removed from the potatoes.

4. The method of claim 1 wherein the caustic film-coated potatoes are held in a digester and thereafter transferred to a peeler for removal of the skins.

5. In a method of producing dehydrated potato flakes, the steps of immersing raw potatoes in a heated aqueous caustic solution for a time period of 1 to 5 minutes, circulating the solution through a heating and filtration system for maintaining the solution at a temperature of 185° to 212° F. and in a substantially uncontaminated condition, maintaining the concentration of said solution at 4 to 10% by weight of sodium hydroxide, removing the potatoes from said solution while allowing a film of caustic solution to adhere to the potatoes, holding for digestion the removed caustic film-coated potatoes for 5 to 30 minutes under temperature conditions maintained relatively constant to impregnate the potatoes and thereafter removing the skins from the potatoes with water jets.

6. The method of claim 5 wherein the caustic film-coated potatoes are held in a digester which permits the caustic film to react with the skins and thereby reducing the amount of caustic consumed in the process.

7. A method of producing dehydrated potato flakes which includes the successive steps of immersing washed raw potatoes in an aqueous caustic solution having a 4 to 10% by weight concentration of sodium hydroxide for a time period of from 1 to 5 minutes maintaining the temperature of said solution between 185° and 212° F., continually circulating said solution through a heating and filtration system for maintaining said temperature and for removing impurities from the solution, removing the potatoes from said solution after elapse of said time period while allowing a film of the solution to adhere to the potatoes, holding for digestion the removed caustic film-coated potatoes for 5 to 30 minutes under temperature conditions maintained relatively constant to impregnate the potatoes to deteriorate the potato skins, peeling the deteriorated skins from the potatoes with water jets impinged thereagainst, slicing the peeled potatoes to particle sizes having a thickness range of about 0.5 to 0.625 inches, precooking the sliced potatoes in an aqueous bath maintained at a temperature of about 145° to 185° F. for ten to 45 minutes for controlling the mealiness of the potatoes, cooling the thus precooked potatoes to a temperature of about 40° to 80° F. for converting the soluble starch in the precooked potatoes into substantially insoluble starch, cooking the cooled potatoes at temperatures of about 185° to 212° F. for 15 to 40 minutes, ricing the thus cooked potatoes to mash the sliced potato particles without substantial disruption of the cellular structure, spreading the riced potatoes on a heated rotating drum in a layer of about 0.005 to 0.008 inches in thickness, dehydrating the layer on said drum to a moisture content of about 4 to 10%, scraping the dried layer from the drum in the form of a thin sheet, and breaking the sheet into flakes of desired size.

8. The method of claim 7 wherein the peeled potatoes are trimmed and culled before slicing.

9. The method of claim 7 wherein the potatoes are collected in a metering control unit before the slicing step.

10. The method of claim 7 wherein antioxidants and preservatives are added to the cooked potatoes prior to ricing which is prior to depositing the potatoes on the drum.

11. The method of claim 7 wherein applicator rolls spread the potatoes on the drum to maintain a uniform application of the potatoes to the drum.

References Cited

UNITED STATES PATENTS

| | | | |
|---|---|---|---|
| 2,959,487 | 11/1960 | Notter et al. | 99—207 |
| 3,063,849 | 11/1962 | Nelson et al. | 99—207 |
| 3,314,805 | 4/1967 | Templeton | 99—207 |
| 3,417,483 | 12/1968 | Willard | 99—207X |
| 3,394,012 | 7/1968 | Kolton et al. | 99—207 |
| 3,016,303 | 1/1962 | Cooley | 99—207 |

NORMAN YUDKOFF, Primary Examiner

J. SOFER, Assistant Examiner

U.S. Cl. X.R.

99—100